Patented Jan. 6, 1953

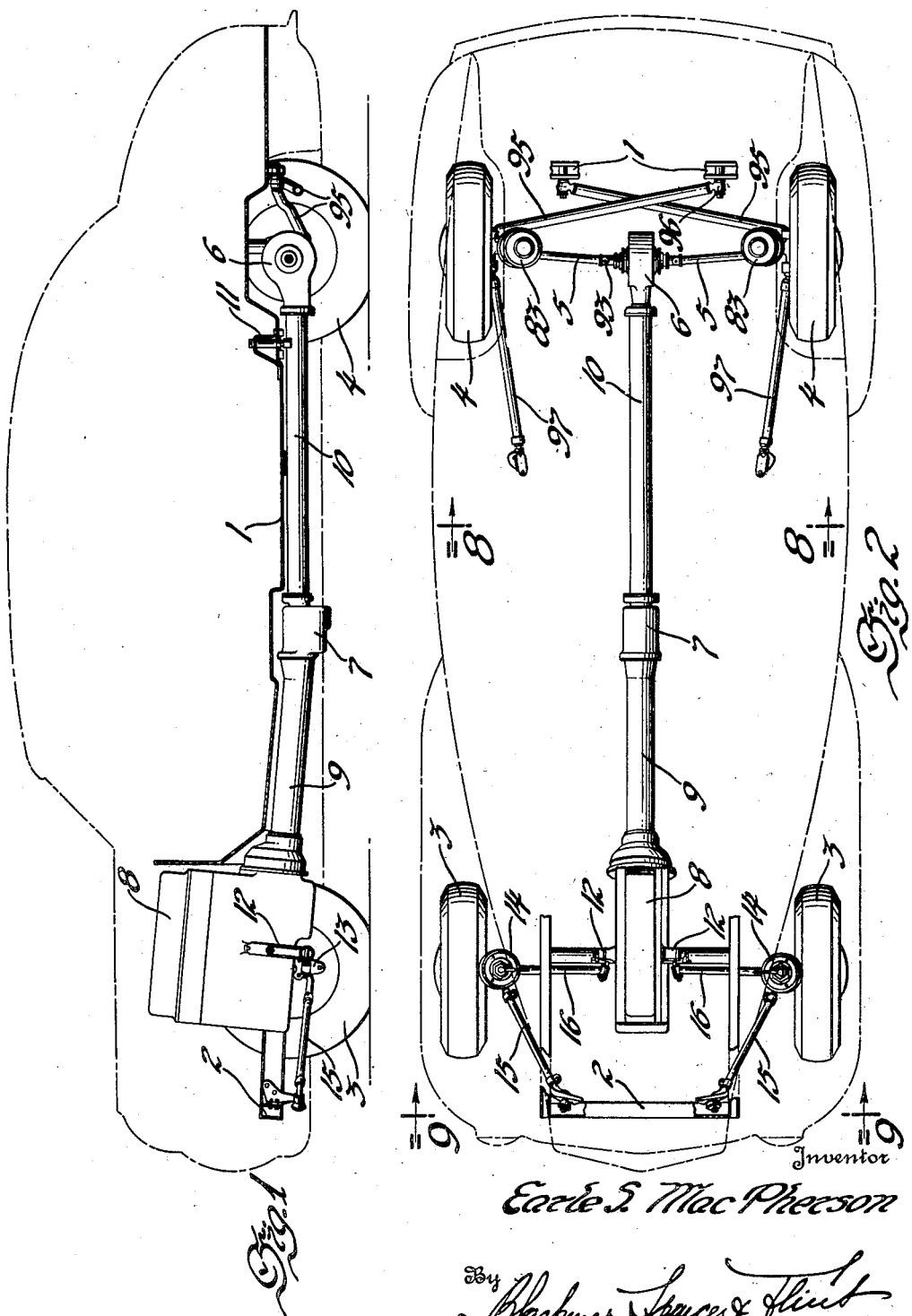

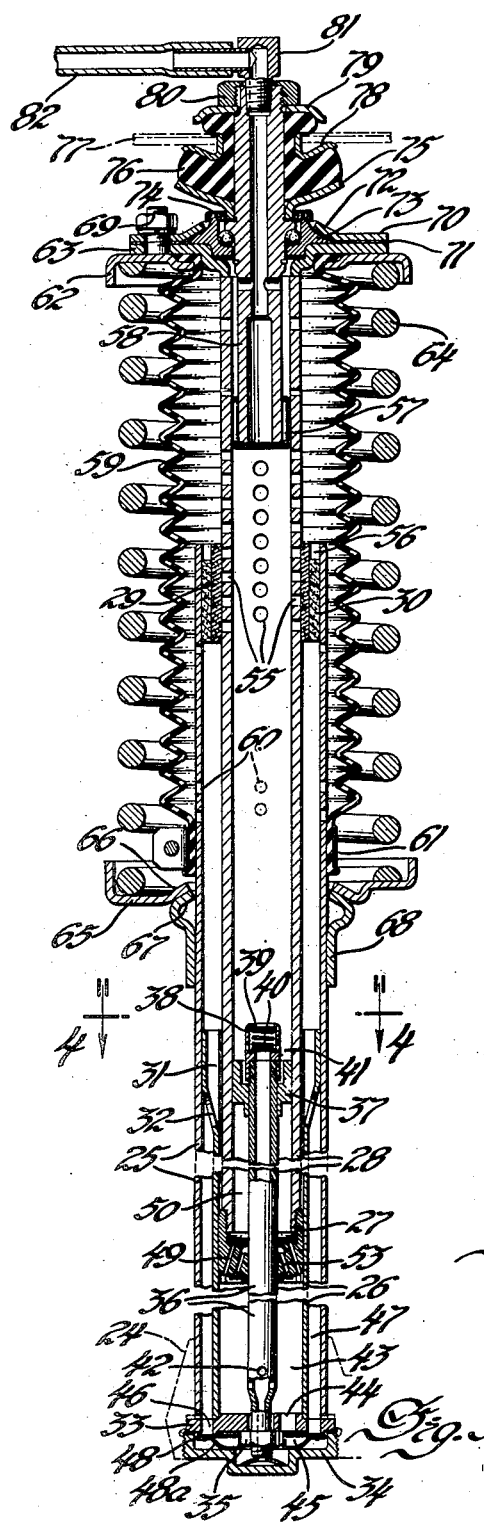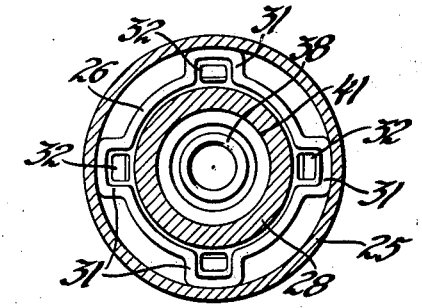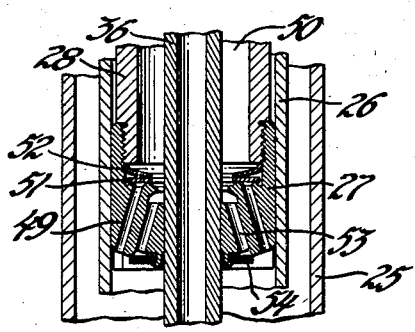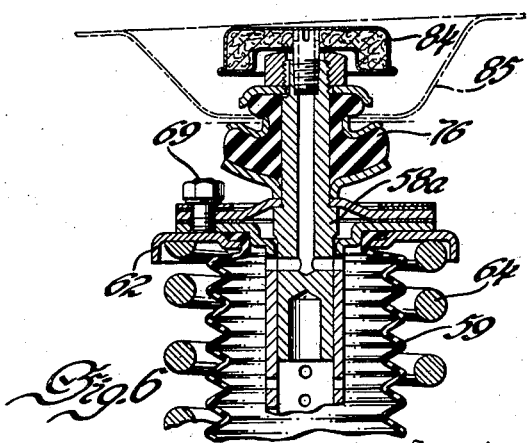

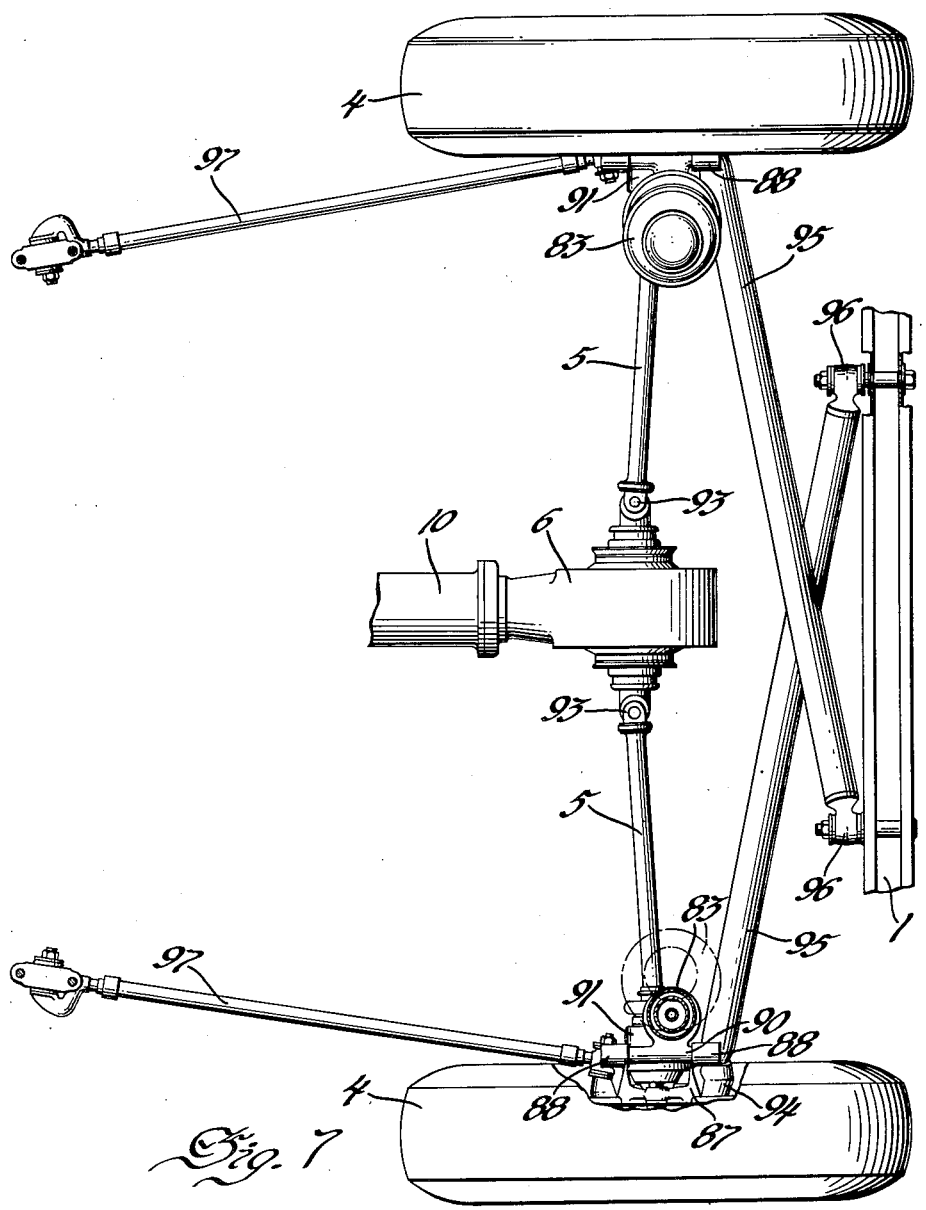

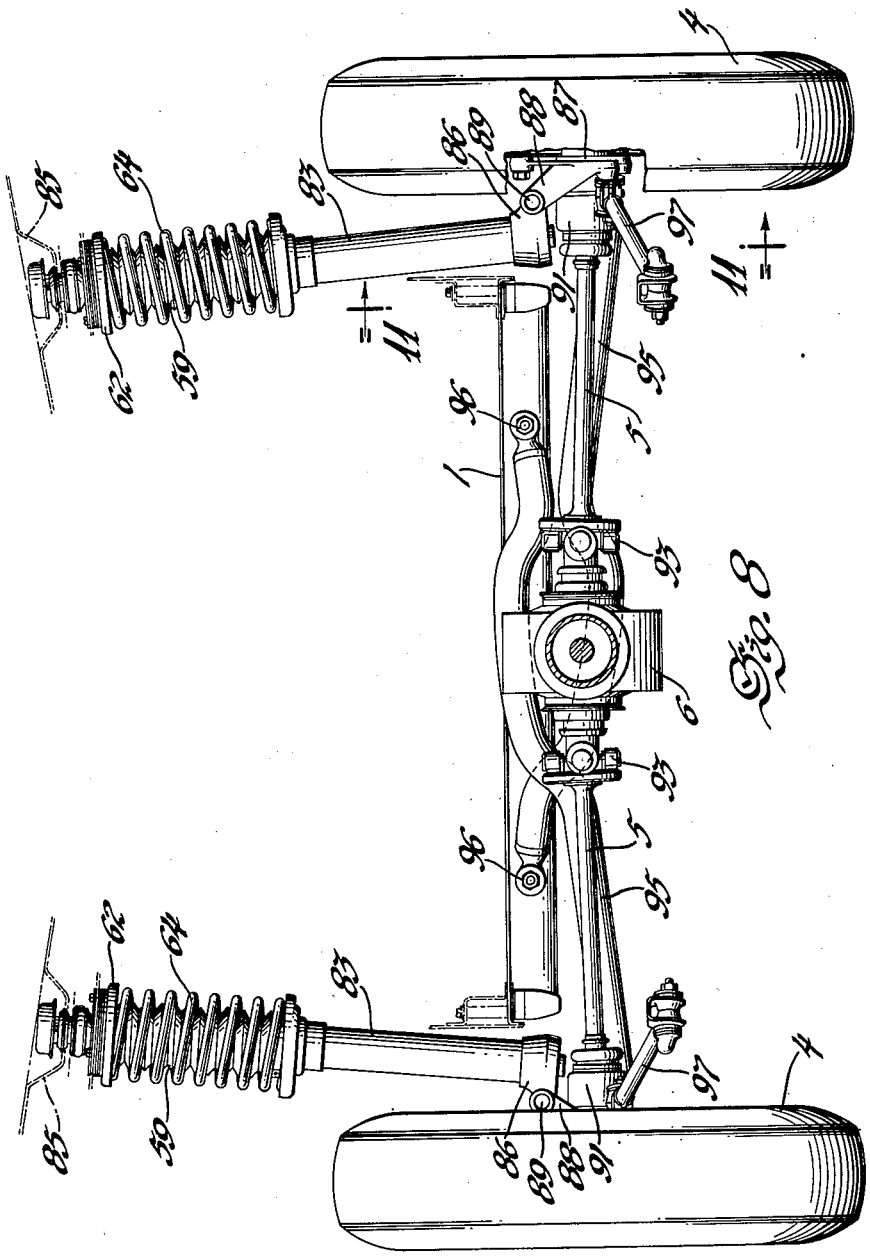

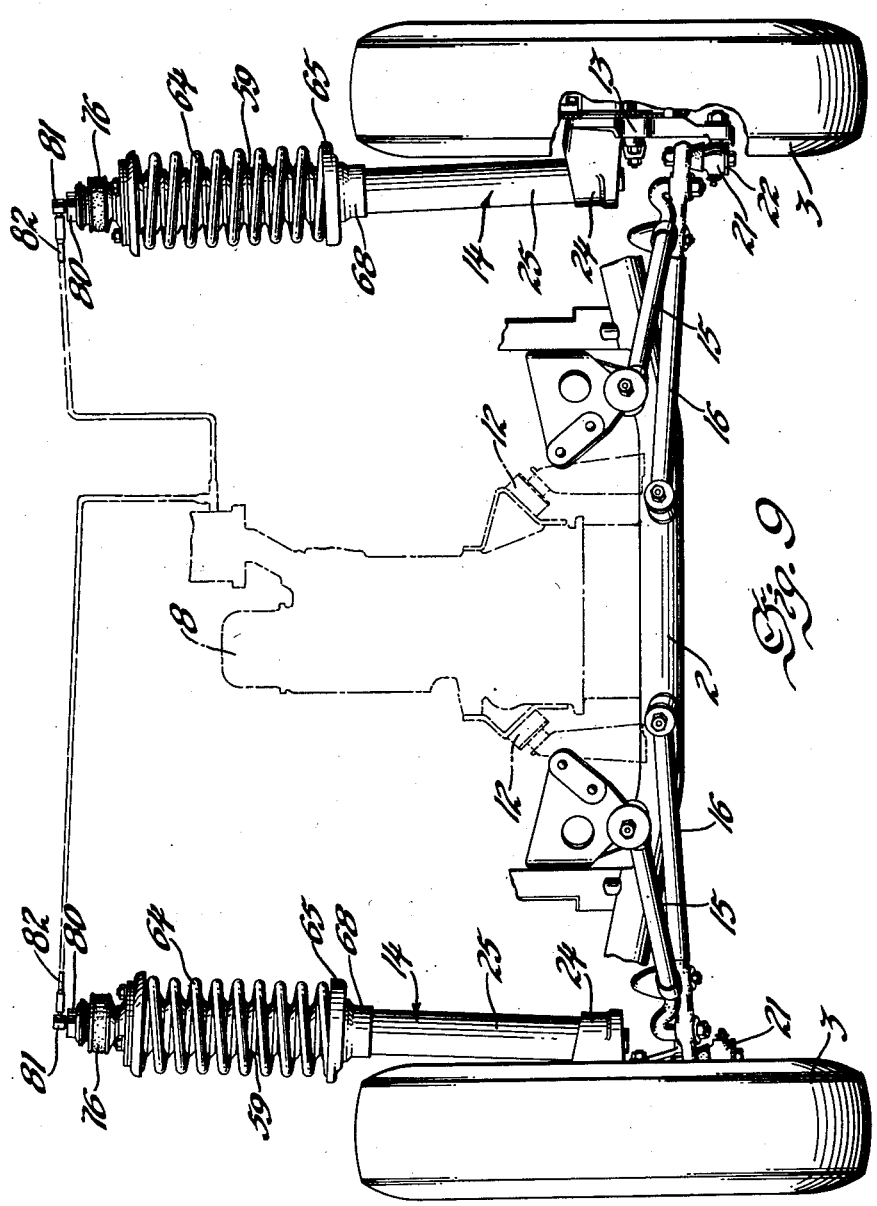

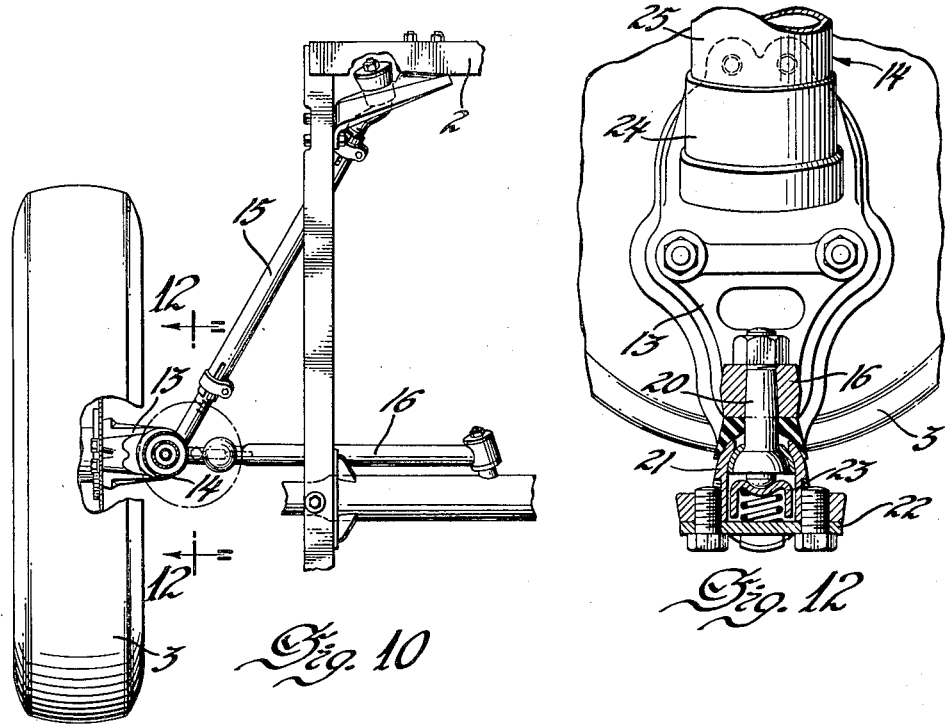
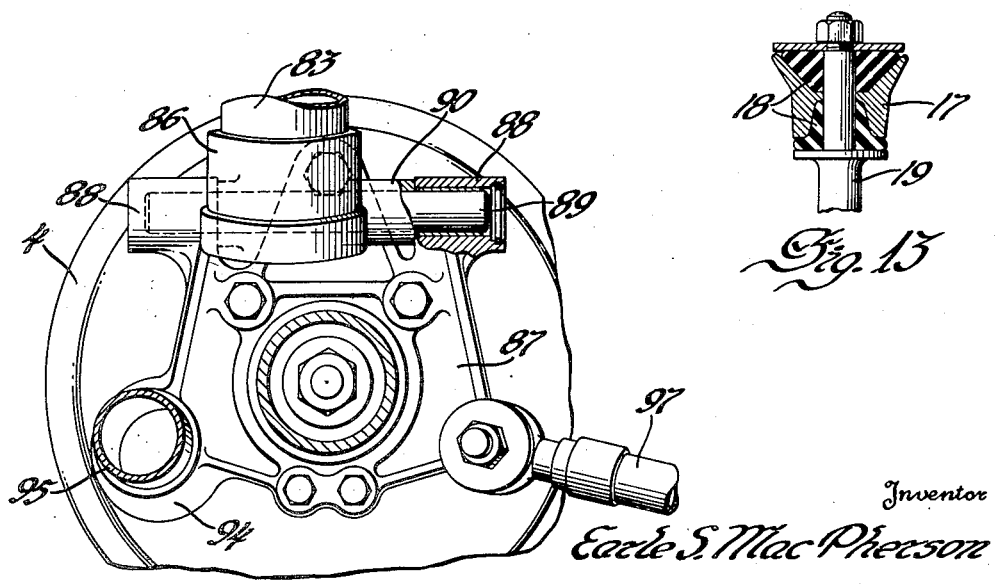

2,624,592

UNITED STATES PATENT OFFICE 2,624,592

VEHICLE WHEEL SUSPENSION SYSTEM

Earle S. MacPherson, Detroit, Mich., assignor to General Motors Corporation, Detroit, Mich., a corporation of Delaware Application March 21, 1947, Serial No. 736,262

24 Claims. (Cl. 280—96.2)

This invention relates to motor vehicles and more particularly to an improved suspension system by which the load carrying body is flexibly mounted upon road wheels.

It is an aim of the invention to reduce weight and save material by employing easily formed parts from readily available or conventional stock with a minimum of special and expensive machining operations and in a cooperative relationship to afford a reliable and sturdy arrangement for dependable performance over a long period without frequent attention to lubrication and other service maintenance.

Other objects and advantages will become apparent from the following specification having reference to the accompanying drawings wherein Figures 1 and 2 are, respectively, a longitudinal vertical section and a plan view of the running gear of a motor vehicle of the type having a pair of front steerable road wheels and a pair of rear driving wheels all independently joined to and supporting a load carrying body on which is mounted a power unit assembly comprising a forwardly disposed engine, a centrally located transmission and a rearwardly positioned differential with universally jointed drive shafts connecting the sprung differential with the rear driving wheels; Figure 3 is a sectional view of a vertical suspension strut; Figure 4 is a section on line 4—4 of Figure 3; Figure 5 is an enlarged fragmentary section of the shock absorber valving; Figure 6 is a sectional view showing a variant at the upper portion of the suspension strut; Figure 7 is an enlarged plan view of the rear wheel suspension system; Figures 8 and 9 are elevations as on line 8—8 and line 9—9, respectively, of Figure 2; Figure 10 is a plan view of a front wheel suspension; Figure 11 is a detail view as on line 11—11 of Figure 8; Figure 12 is a detail section on line 12—12 of Figure 10 and Figure 13 is a detail section of a suitable hinged joint.

For a passenger automobile the load carrying body may be of the so-called frameless or combined chassis and body type and which includes the floor 1 of the passenger compartment having a forward frame extension 2. Conventional steering linkage, not shown, may be provided for the pair of front wheels 3—3 individually joined to the extension frame 2. The rear road wheels 4—4 are independently joined to the body and are drive connected by universally jointed shafts 5—5 with the differential mechanism within the housing 6 forming a part of the unit power plant mounted on the sprung body. In addition to the differential mechanism the power unit comprises the usual change speed gear box 7 and an internal combustion engine 8 located in the forward engine compartment ahead of the passenger compartment. Supporting tubes 9 and 10 enclosing drive shafting rigidly join the centrally disposed gear box with the engine 8 and the differential housing 6 and the unit is mounted on the body by a rear connection 11 and forward mounts 12 on both sides of the engine.

Each front wheel 3 is rotatably mounted on a suitable stub axle which is fixed to or formed as a part of the forged mounting member 13 joined to the body by a vertical telescopic strut 14 and by a pair of horizontal swinging links or levers 15 and 16. The latter are divergently related and are interpivoted at their apex on an axis extending vertically or normal to their axial length and both are hinged to the body at longitudinally spaced points and preferably by rubber joints which require no lubrication. As a typical example of a hinged joint reference is made to Figure 13 wherein the numeral 17 represents an eye or outer joint member receiving a pair of bushings 18 of rubber or other similar elastic deformable material fitted to an inner member or central pin 19. Spaced retainer flanges on the pin squeeze the rubber bushings 18 into tight engagement with the eye 17 and pin 19 and the elasticity of the rubber accommodates swinging link travel and affords a certain degree of universal joint action to enable relative link adjustment as well as misalignment and wide manufacturing tolerances. The interpivotal action at the apex of the swinging links 15 and 16 permits relative adjustment of the links in setting wheel caster or more particularly the variation in length of the link 15 will move the link 16 about its frame connected end so that its wheel supporting end can be shifted fore and aft. Accordingly the longitudinally extending link 15 is formed as a turnbuckle comprising separately formed opposite end pieces threaded into the ends of the central tube portion, the tube ends being split and provided with clamping rings to secure the parts in adjusted position. With the threads at opposite ends of opposite hand the rotation of the central tube section will draw the end pieces together or spread them apart and such adjustment is accommodated by the rubber hinged joints for the links. Such fore and aft movement of the wheel connection will change the fore and aft inclination of the vertical strut 14 about whose axis the road wheel is dirigible for steering purposes. At the outer end of the link 16 there is fixed a ball stud 20 having a bearing in a socket 21 formed integral with the wheel mounting member 13. A removable closure plate 22 locates a spring pressed ball seat 23 within the socket 21 after the ball stud has been assembled through the open end of the socket. This ball joint accommodates caster adjustment and also the dirigibility of the wheel and it is located approximately on the axis of the telescopic strut 14.

The telescopic strut 14 is rigidly joined to the wheel mounting member 13 and for that purpose there is formed integral with the wheel mounting member an inwardly projecting tubular sleeve 24, to be welded or press fitted to the lower end of the outermost tube 25 of the telescopic strut assembly. Nested within the lower portion of the tube 25 and concentric therewith is a smaller diameter outer tube portion 26 which slidably receives a bearing cap 27 threaded on the lower end of the inner tube 28. Axially spaced from the bearing cap 27 is a bearing sleeve 29 slidably engaging the inner tube 28 and fixed by means of a spacer ring 30 with the upper end of the outermost tube 25. These widely spaced slide bearings afford lateral stability to the telescopic tube assembly and the spacing between the enlarged diameter tube 25 and the smaller diameter tubes 26 and 28 afford circumferential clearance for utilization as a make-up chamber to contain hydraulic shock absorber fluid. At its upper end the small diameter outer tube portion is flared outwardly at four places, as shown at 31 in Figure 4, for contact with the wall of the outer tube 25. If desired the bottom of each of the outwardly pressed portions 31 may be provided with a drain opening 32. The lower end of the tube 26 is seated in a cutaway portion of a spacer plate or disc 33 fitted to the interior of the mounting sleeve 24 and held in place by a hollow plug 34 threaded into the lower end of the sleeve 24. Secured in a central opening in the spacer plate 33 by means of a nut 35 is the lower end of a hollow piston rod 36 projecting upwardly through the bearing cap 27 for mounting a piston 37 slidably engaging the wall of the inner tube 28. A housing 38 threaded on the upper end of the piston rod 36 encloses the coil spring 39 and a spring seated disc valve 40 closing the end of the hollow piston rod and arranged as a one-way valve to open into the chamber 41 within the tube 28 above the piston 37. Near its lower end the piston rod has one or more openings 42 which open freely into the chamber 43 formed by the tube 26 below the bearing cap 27. This chamber 43 at its lower end communicates through an opening 44 in the spacer disc 33 with the hollow portion 45 within the plug 34. Additional openings 46 in the spacer are aligned with the make-up chamber 47 between the tubes 25 and 26 also to communicate with the space 45. A one-way valve in the nature of a flat ring 48 and a disc spring 48ª seats over the passages 46. Hydraulic fluid from the make-up chamber is drawn past the valve 48 and into the chamber 43 whenever occasion requires to maintain sufficient body of fluid for proper shock absorbing action. From the chamber 43 a series of openings 49 lead through the bearing cap 27 into the working cylinder 50 below the piston 37 in the tube 28. This series of passages 49, as best seen in Figure 5, are closed at their inner ends by a valve ring 51 resiliently seated by a spring ring 52. Leading away from the working cylinder 50 and through the bearing cap 27 are a second series of passages 53, whose outer ends are closed by a pack of spring rings 54.

It will be understood that upon relative telescopic movement of the tubes the movement of the piston along with the outer tube and within the inner tube will vary the size of the chamber 50 and as the size of the chamber increases additional fluid will flow through the passages 49 into the chamber and from the chamber 43 which simultaneously is being decreased in size. Similarly the chamber 43 increases in size as the chamber 50 decreases in size and fluid is displaced through the passages 53. The passages 49 and 53 are restricted according to predetermination and thereby control the rate of relative tube travel to check and dampen violent forces. Back pressure within the chamber 43 displaces liquid through the openings 42 into the hollow piston rod 36, such pressure closing the check valve 48 and opening the check valve 40 at the top of the piston rod for delivery of the hydraulic fluid into the chamber 41. The excess supply within the chamber 41 is relieved by a series of openings 55 near the top of the inner tube 28 for return to the make-up chamber 47. Thus continuous reciprocation of the telescopic tube will effect a circulation of hydraulic fluid from the make-up chamber and return and among other things insures lubrication to the relatively movable parts in the strut assembly. Thus the openings 55 are provided in the range of travel of the sliding bearing 29 and no attention needs to be given to this bearing nor to the bearing 27 which is submerged in the fluid. By preference the bearing sleeve 29 should be made of porous material which will retain a certain amount of the fluid. In cooperation with it the spacer sleeve 30 may be formed of similar material but in any event it may be formed of a shorter length to provide a trap reservoir or basin 56 between the upper end of the bearing sleeve 29 and the outer tube 25 so as to insure a supply of fluid and which should be of special consequence at the start of vehicle operation following a prolonged storage period.

The splash of the hydraulic fluid and any mist or vapor will also serve to lubricate the needle bearings 57 upon which the upper end of the strut assembly rotates upon a hollow stationary stub shaft 58 which is secured to the body by means of a resilient joint. To seal the sliding joint between the telescopic tubes there is provided a flexible bellows 59 secured at opposite ends to the respective tubes and which leads any overflow fluid which runs down the outside of the outer tube 25 back to the series of drain holes 60 through the wall of the tube near the lower end of the bellows. The lower end of the bellows is secured to the tube by a split clamping ring 61. Its upper end is clamped and seals the joint between a disc 62 and the lateral flange 63 welded on the upper end of the inner tube 28. The disc 62 has a dependent peripheral rim and it forms a seat for the upper end of a load supporting helical coil spring 64 whose opposite end is seated on a pad 65 which surrounds the outer tube 25 and has a central bearing lip 66 presenting an abutment surface on a spherical radius for contact with a mating bearing surface 67 carried by a sleeve 68 embracing and secured to the wall of the outer tube 25. The load is transmitted to the wheel primarily through the outer tube and the coil spring nested in concentric relation therewith. The upper spring seat 62 has a series of upwardly extending studs 69 welded thereto to extend through the inner tube flange 63 and a cooperating retainer disc 70, there preferably being a sealing gasket 71 between the flange 63 and retainer 70. At its central edge the retainer 70 is formed with an upwardly extending portion 72 for engagement with a peripheral flange on the outer race 73 of a thrust bearing. A shouldered portion at the bottom of the bearing is seated within a correspondingly shaped shoulder or depression of the flange 63 and a series of antifriction balls are located by the race in engagement with the seat on the mounting stud 58. At its upper end the outer race 73 has a tapered nose portion fitted to a sealing gasket held within a sheet metal retainer cup 74 whose inner end is clamped to the bearing shoulder of the stud 58 by a central sleeve portion of a disc 75 which cooperates with a rubber collar 76 surrounding the stud 58 and serving to mount the same on the body. A portion of the body is indicated in dotted lines by the numeral 77 extending between upper and lower flanges of the rubber bushing 76 and through which a reduced neck portion of the bushing extends. A locating abutment or sheet metal disc 78 has a central tubular portion surrounding the neck of the bushing and extending into the opening of the member 77 as well as a peripherally extending portion which cooperates with the bearing plate 75 in containing the rubber therebetween. The head portion of the rubber bushing 76 is held in place by a retainer washer 79 secured under a nut 80 threaded on the upper end of the hollow mounting stud 58. A fitting 81 is secured to the stud 58 and communicates the hollow bore of the stud by means of a flexible tube 82 with a source of clean air. For convenience the source of clean air at the front of the vehicle may be the usual carburetor air cleaner. The communication thus provided affords a breather to avoid air under pressure being built up in the flexible walled bellows incident to contraction of the telescopic tubes.

The combined load supporting spring and shock absorber as described is also incorporated in the telescopic vertical strut at 83 of the rear wheel suspension system. In this case, however, the mounting stud needs not provide for oscillation about the axis of the tubes and accordingly the mounting stud 58a may be welded within the top of the central tube with the omission of the antifriction bearings before referred to. For breathing purposes the interior of the sealing bellows is vented through a passageway in the hollow mounting stud 58a and as shown in Figure 6 the outer end of the passage communicates with an air cleaner unit 84. This unit may consist of a pair of cupped stampings secured together to enclose a filter material for excluding dirt. Otherwise the parts illustrated in Figure 6 correspond generally to the similar parts shown in Figure 3, including the rubber joint mounting for attaching the upper end of the strut to a body bracket 85.

At its lower end the strut terminates in a mounting sleeve 86 for pivotal connection with a rear wheel mounting member 87. Integral with the member 87 at its upper ends are a pair of longitudinally spaced and axially aligned eyes 88—88 housing a bearing sleeve for the opposite ends of a hinge pin 89 extending through an apertured eye 90 constituted by a lateral projection on the mounting sleeve 86. The wheel supporting member 87 is provided with an outwardly extending hub on which the wheel is rotatably mounted and the wheel is joined to a stub shaft or projection extending through a central opening in the member 87 and connected by a universal joint 91 with an axle shaft 5 which in turn is also connected by a universal joint connection 93 with the differential driving mechanism. Also formed integral with the wheel supporting member 86 is a transversely extending sleeve 94 in which is received and rigidly secured, as by means of welding, the outer end of a tie rod or link 95 which is of an overall length more than half the rear wheel tread so that it extends beyond the longitudinal center line and is secured at its inner end as at 96 to the body by means of a rubber hinged joint. In the region of the longitudinal center line of the body the swinging links for the two road wheels will cross one another and to avoid interference these rods are offset or bowed in opposite directions relative to one another, as best seen in Figure 8. To complete the wheel and frame interconnection and take longitudinal thrust a forwardly extending link 97 is provided connected at opposite ends to the wheel mounting member 87 and the body. This longitudinal link has its opposite ends threaded and slotted to receive end connecting members and to be embraced by a clamping ring which holds the parts in adjustment. The threaded shanks of the opposite end pieces are threaded on opposite hand so that rotation of the central tube portion will draw the end pieces together or spread them apart. The rearward end terminates in an apertured head to receive a pin carried by the mounting member 87 with rubber sleeve insulation between the eye and the pin. A gooseneck pin is formed on the front end piece to carry the rubber insulation within a body mounting eye, the several rubber joints referred to yielding to accommodate the rise and fall of the wheels without need for arranging coaxially the pivot joints for the swinging links.

I claim:

1. Means to suspend a load supporting body on a pair of road wheels including a pair of wheel mounts, transverse arms of greater length than one half the wheel tread, rigidly joined at their outer ends to the wheel mounts and pivotally joined at their inner ends to the body beyond its longitudinal center line, said arms crossing one another in the region of said center line and being oppositely offset in said region, a pair of longitudinal distance rods pivotally joined at opposite ends to the body and the wheel mounts, vertically disposed telescopic struts, each having its upper portion joined to the body and its lower portion joined to a wheel mount on a longitudinal pivotal axis and spring means interposed between the body and said lower strut portions.

2. Means to support a body on a wheel for vertical rise and fall of the wheel relative to the body, including a wheel mounting member, a vertically disposed telescopic spring strut pivoted at opposite ends to the member and the body, a longitudinally disposed stay bar also pivoted at opposite ends to the member and the body and a transversely disposed stay bar rigidly joined at one end to the wheel mounting member and projected beyond the body longitudinal center line for pivotal connection with the body.

3. The structure of claim 2 wherein the several pivotal connections are non-coaxial in relation to one another and a yieldable substance is incorporated in at least certain of the joints.

4. In the mounting of a body upon a pair of independently sprung wheels, a pair of wheel supporting members having inwardly extending stay bars rigid therewith and crossing one another for pivotal connection with the body beyond the body longitudinal center line, said bars at the point of crossing being relatively outwardly displaced for clearance, longitudinal stay bars joining the wheel supports to the body, vertically disposed telescopic struts pivotally connected at opposite ends to the body and the wheel supports, load supporting coil springs in nested relation with the struts and interposed between the body and the strut sections joined to said wheel supports, and a body carried differential drive unit having universally jointed drive shaft connection for both wheels.

5. In an independent wheel suspension for a body, a support having a wheel hub journal on which the wheel has rotatable bearing and a wheel torque reaction receiving and load transmitting coupler and attachment plate rigid with the journal projecting therefrom and through which the wheel brake mechanism is mounted, stay bar means projecting from the reaction plate in substantially horizontal direction for pivotal connection with the body, an upright telescopic strut embodying a load supporting spring and having a hinged connection at its top with the body, and a hinged connection between the lower end of said strut element and the reaction plate element comprising a longitudinally extending hinge pin carried by one of said elements and an apertured member on the other of said elements to receive and provide a bearing for the hinge pin.

6. In an independent wheel suspension system, a load carrying coil spring interposed between the body and a road wheel to resiliently support the body on the road wheel for relative rising and falling movement, lateral and upright struts cooperating with one another in accommodating said rising and falling movement, said upright strut being surrounded by the coil spring and being constituted by a circular piston and a liquid containing cylinder slidably receiving the piston, together with a bearing tube assembly fixed for movement with the piston and arranged in nested slidable bearing relation with said cylinder above and below the position of the piston therein and serving to relieve the piston of lateral stress, a backing plate and load receiving coupler member having non-dirigible means to rotatably mount a wheel thereon, lateral and upright strut connecting formations on said member for joining said lateral and upright struts thereto, one of said formations rigidly joining one of said struts to the member and the other formation cooperating to provide a pivotal connection with the other strut.

7. In an independent wheel suspension system, a supporting member having means to rotatably mount a wheel thereon, an upright spring strut secured to the support, said strut and said support arranged for oscillation about the strut axis, a substantially transverse horizontal stay bar having a ball joint connection at one end with said support in substantially aligned relation with the axis of said upright strut and a pivot connection at its opposite end with the body, a longitudinal stay bar having its opposite ends hinged at longitudinally spaced points to the first mentioned stay bar and to the body and means to adjust the longitudinal stay to shift the position of its connection with the first mentioned stay and set wheel caster.

8. In an independent wheel suspension system, a supporting member having means to rotatably mount a wheel thereon, an upright spring strut having a rubber joint connection at its upper end with the body and secured at its lower end to the wheel support for oscillation about the strut axis, a pair of horizontal stay bars having rubber joint connections at their inner ends with longitudinally spaced portions of the body and hingedly interconnected at their outer ends, a universal joint connection between one of said bars and the wheel support to accommodate wheel support oscillation about the strut axis, and means to adjust wheel caster as accommodated by the several rubber joint connections by a longitudinal adjustment of one of said stay bars.

9. In an independent wheel suspension system, an oscillatable supporting member having means to rotatably mount a wheel thereon, stay bar means pivoted to the body and the wheel support to locate the latter horizontally, an upright strut secured at opposite ends to the body and the wheel support and comprising a pair of telescopic tubes each having a spring seat, a coil spring in concentric relation to the tubes and engaged by said tube seats, the connection between the strut and the body including a stub shaft fixed to the body and projected into the upper tube in rotatable and thrust bearing relation thereto whereby said strut and said member comprise a turn pivot for said wheel, and a shock absorbing piston fixed with the lower tube and slidably housed in the upper tube for coaction with fluid therein.

10. In the suspension of a body on a wheel, upper and lower tubes telescopically interfitted at adjacent ends to constitute a strut for connection at opposite ends with the body and the wheel support, said lower tube comprising a pair of concentric cylinders fixed one within the other in spaced apart relation, means to communicate said space between said cylinders with the space interiorly of the innermost cylinder and below the bottom of the upper tube, which space serves as a make-up chamber for shock absorber liquid, a load carrying spring seating on the upper and lower tubes, slidable bearings carried on the interfitted tube ends, each to engage the other tube, a piston fixed in relation to the outer tube and slidably engaged with the inner tube above the lower end thereof, a valve closure for said lower tube end controlling liquid flow between the make-up chamber and the dashpot space within the tube and below the piston, a flexible bellows surrounding the tubes and having opposite ends secured to the upper ends of the inner and outer tubes and an air breather vent for the bellows enclosed space extending within the inner tube above said piston for the maintenance of atmospheric pressure therein.

11. In the suspension of a body on a wheel, upper and lower tubes telescopically fitted together as a strut for connection at opposite ends with the body and the wheel support, a load carrying spring seating on the upper and lower tubes, said tubes being spaced apart to provide a hydraulic fluid make-up supply chamber, a cylinder forming a unit with the lower end of the outer tube and having an interior diameter substantially corresponding with the exterior diameter of the inner tube for a close sliding fit therewith, a piston fixed to the outer tube and slidable within the inner tube to induce fluid flow through a restricted passage between the inner and outer tube chambers, means comprising a drain opening in the upper end of the inner tube wall for relieving excess fluid above the piston and means to insure return of said fluid to the make-up chamber, including a flexible bellows joined at its lower end with the upper end of the outer tube and joined at its upper end with the inner tube above said drain opening, there being a communicating opening through the outer tube wall near the bottom of the bellows interior.

12. In the suspension of a body on a wheel, a pair of nested upper and lower tubes constituting a telescopic strut for connection at opposite ends with the body and the wheel support, a load carrying spring seating on the upper and lower tubes, the lower tube including as a unit assembly a cylinder slidably receiving and closely fitting a bearing cap on the end of the inner tube and an outer tube spaced from the inner tube to afford a supply chamber separated from the interior of the cylinder by the wall thereof, a slide bearing carried on the upper end of the outer tube to engage the inner tube and provided with a fluid trapping groove to contain a bearing lubricant supply, a piston slidable upon relative tube travel within the inner tube to force fluid through openings near the top of the inner tube wall to the said fluid trapping groove, and a bellows seal surrounding the upper ends of and joined at opposite ends to both tubes to prevent escape of said fluid.

13. In a load carrying strut having a body of incompressible liquid in its lower portion and atmospheric air in its upper portion above the normal liquid level, an outer tube for connection with a wheel support, an inner tube telescoped within the outer tube and formed near its lower end with a piston dashpot chamber, slidable bearings on the end of each tube to engage the other tube, a piston slidable in the inner tube dashpot chamber upon tube travel, a mounting stub projected into the top of the inner tube and having a breather passage therein, a spring concentric with the tubes and bearing on seats carried by the respective tubes, and a bellows seal joined to the upper ends of both tubes with its interior space communicating with said breather passage.

14. In a device of the character described, inner and outer telescopic tubes, a bearing cap on the end of the inner tube slidably engaging the outer tube and having a pair of passages therethrough, one containing a one-way valve opening into the inner tube and the other containing a one-way valve opening into the outer tube, a third tube rigid with and incasing the outer tube with space therebetween to afford a make-up chamber, said third tube projecting beyond said outer tube carrying at its end a bearing to engage slidably with the inner tube, a hollow piston rod rigid with the outer tube and projected slidably through said bearing cap, a piston on said rod slidable on the inner tube upon relative tube travel, means freely communicating the hollow rod with the outer tube beyond said bearing cap, a one-way valve communicating the hollow rod with and opening toward the inner tube chamber above the piston, a one-way valve communicating the hollow rod with and opening away from said make-up chamber, and overflow means from the inner tube chamber above said piston, leading to said make-up chamber.

15. Spring suspension comprising a series of control arms extending in divergent relation from a road wheel to a load carrying body and cooperating to resist longitudinal and transverse displacement while accommodating vertical movement, certain of said arms being inextensible and extending substantially horizontally and another of the arms extending vertically and including a pair of telescopic hollow tubes, one of said tubes being of stepped diameter in that one portion of its longitudinal extent is of a different diameter than the remaining portion of its longitudinal extent, the portion of one diameter fitting closely to the other of said tubes and the remaining portion being radially spaced from said other tube to cooperate therewith in affording a liquid receiving chamber, means to communicate said chamber with the operating chamber which retractably-projectably receives the innermost tube, guide bearing collars carried at the internested ends of the respective tubes in sliding engagement each with the other tube, spring abutments carried by the respective tubes, a load transmitting spring surrounding the tubes between said abutments to yieldingly resist tube collapse, a shock absorber piston fixed to the outer tube and slidable within the lower end of the inner tube, a body of liquid contained within the tubes and the chambered space between the tubes in piston submerging and guide bearing lubricating relation and means affording restricted liquid flow between said tubes under impetus of relative piston sliding travel.

16. Spring suspension comprising a series of control arms extending in divergent relation from a road wheel to a load carrying body and cooperating to resist longitudinal and transverse displacement while accommodating vertical movement, one of the arms comprising vertically disposed and nested collapsible tubes containing shock absorber fluid, a shock absorber piston fixed to one of the tubes and slidable within the other tube, a coil spring surrounding and seating on both tubes to yieldingly resist their collapse, the uppermost tube being hingedly connected to the body and the other tube being fixed to a dirigible wheel carrier, said wheel carrier being rotatable about the axis of said tubes, another of said arms extending transversely and having one end hinged to the body and its opposite end universally jointed to the wheel carrier in line with the axis of said tubes, and another of said arms extending substantially horizontally in divergent relation to the last mentioned arm and joined thereto at one end with its opposite end hinged to the body.

17. Spring suspension comprising a series of control arms extending in divergent relation from a road wheel carrier to a load carrying body and cooperating to resist longitudinal and transverse displacement while accommodating vertical movement, one of the arms comprising vertically disposed and nested collapsible tubes containing shock absorber fluid, a shock absorber piston fixed to one of the tubes and slidable within the other tube, a coil spring surrounding and seating on both tubes to yieldingly resist their collapse, the uppermost tube being hingedly connected to the body and the other tube being hinged to the wheel carrier, another of said arms extending horizontally and transversely with its inner end hinged to the body and its outer end fixed rigidly to the wheel carrier and another of said arms extending longitudinally with opposite ends hinged to the wheel carrier and body respectively.

18. In the suspension of a body on a dirigible wheel, a vertically disposed strut comprising a pair of tubes telescopically nested one within the other and provided with spaced spring seats, a load carrying spring bearing on said seats to resist telescopic tube collapse, a wheel spindle fixed to the lower tube, a body mounted kingpin projected downwardly into the top of the upper tube and on which the tube is dirigbly journaled, a body of shock absorbing and bearing lubricating liquid within the tube to a normal standing level below the bearing surfaces between the kingpin and the tube, and a shock absorber piston fixed in relation to the outer tube and slidably housed within the bottom of the inner tube below said liquid level and arranged to lift the liquid level and splash lubricate the kingpin bearing upon spring deflection and tube telescopic travel.

19. In an independent wheel suspension system, an upright load carrying assembly rotatably mounted on a substantially vertical axis at its upper end to a body support and vertically pivoted at its lower end to a substantially horizontally disposed swinging body connecting strut, said assembly including, a substantially vertically disposed telescopic guide and hydraulic shock absorber member, a primary load carrying coil spring surrounding said member, and a substantially horizontally disposed stub axle mounted on the lower portion of said member, said stub axle being adapted to rotatably support the wheel thereon.

20. In an independent wheel suspension system, a supporting member having means thereon to rotatably mount a wheel, an upright telescopic strut, means on said strut to support it for rotation approximately about its longitudinal axis on a vehicle body, a substantially horizontally disposed body connecting strut, means rigidly connecting said supporting member and said telescopic strut for rotation together approximately about said longitudinal axis, and additional means on said supporting member pivotally joining said member to said body connecting strut.

21. In an independent wheel suspension system, a supporting member having means thereon to rotatably mount a wheel, an upright telescopic strut, means on said strut to support it for rotation approximately about its longitudinal axis on a vehicle body, means rigidly connecting said supporting member and said telescopic strut for rotation together approximately about said longitudinal axis, a body connecting strut disposed at an angle to said telescopic strut, and additional means on said supporting member pivotally joining said member to said body connecting strut.

22. In an independent wheel suspension system, a supporting member having means thereon to rotatably mount a wheel, an upright telescopic strut, means on said strut to support it for rotation approximately about its longitudinal axis on a vehicle body, means rigidly connecting said supporting member and said telescopic strut for rotation together approximately about said longitudinal axis, a body connecting strut disposed at an angle to said telescopic strut, additional means on said supporting member pivotally joining said member to said body connecting strut, and a second body connecting strut disposed at an angle to said telescopic strut and also at an angle to said first mentioned body connecting strut.

23. In an independent wheel suspension system, a supporting member having means thereon to rotatably mount a wheel, an upright telescopic strut, means on said strut to support it for rotation approximately about its longitudinal axis on a vehicle body, means rigidly connecting said supporting member and said telescopic strut for rotation together approximately about said longitudinal axis, a body connecting strut disposed at an angle to said telescopic strut, additional means on said supporting member pivotally joining said member to said body connecting strut, a second body connecting strut disposed at an angle to said first mentioned body connecting strut, and means pivotally connecting said last mentioned strut to said first mentioned body connecting strut.

24. In an independent wheel suspension system, a supporting member having means thereon to rotatably mount a wheel, an upright telescopic strut, means on said strut to support it for rotation approximately about its longitudinal axis on a vehicle body, means rigidly connecting said supporting member and said telescopic strut for rotation together approximately about said longitudinal axis, a body connecting strut disposed at an angle to said telescopic strut, additional means on said supporting member pivotally joining said member to said body connecting strut, a second body connecting strut disposed at an angle to said first mentioned body connecting strut, means pivotally connecting said last mentioned strut to said first mentioned body connecting strut, and means for adjusting the length of said first mentioned body connecting strut to effect caster adjustment of said wheel.

EARLE S. MacPHERSON.

REFERENCES CITED

The following references are of record in the file of this patent:

UNITED STATES PATENTS

| Number | Name | Date |
|---|---|---|
| 1,033,348 | Rimailho | July 23, 1912 |
| 1,956,669 | Charles | May 1, 1934 |
| 1,961,634 | Faunton | June 5, 1934 |
| 2,044,232 | Tjaarda | June 16, 1936 |
| 2,045,027 | Sanford | June 23, 1936 |
| 2,048,418 | Warren | July 21, 1936 |
| 2,057,893 | Gross | Oct. 20, 1936 |
| 2,078,364 | Becker et al. | Apr. 27, 1937 |
| 2,124,087 | Smith | July 19, 1938 |
| 2,152,660 | Paton | Apr. 4, 1939 |
| 2,163,255 | Binder et al. | June 20, 1939 |
| 2,212,259 | Binder | Aug. 20, 1940 |
| 2,225,966 | Beemer | Dec. 24, 1940 |
| 2,285,954 | Wahlberg | June 9, 1942 |
| 2,322,890 | Slack | June 29, 1943 |
| 2,402,562 | Lewis | June 25, 1946 |

FOREIGN PATENTS

| Number | Country | Date |
|---|---|---|
| 297,438 | Great Britain | Dec. 13, 1928 |
| 316,910 | Italy | Apr. 18, 1934 |
| 347,150 | France | Dec. 23, 1904 |
| 435,361 | Great Britain | Sept. 19, 1935 |